Feb. 17, 1953 E. C. McRAE 2,628,510
VEHICLE TRANSMISSION CONTROL
Original Filed Nov. 17, 1949 5 Sheets-Sheet 1

E. C. McRAE
INVENTOR.

BY J. R. Faulkner
L. H. Oster

ATTORNEYS

Feb. 17, 1953          E. C. McRAE          2,628,510

VEHICLE TRANSMISSION CONTROL

Original Filed Nov. 17, 1949          5 Sheets-Sheet 2

LOW–2.3 TO 1.0 RATIO

REVERSE 2.0 TO 1.0 RATIO

INTERMEDIATE 1.57 TO 1.0 RATIO

E. C. McRAE
INVENTOR.

BY J. R. Faulkner
    J. H. Oster

ATTORNEYS

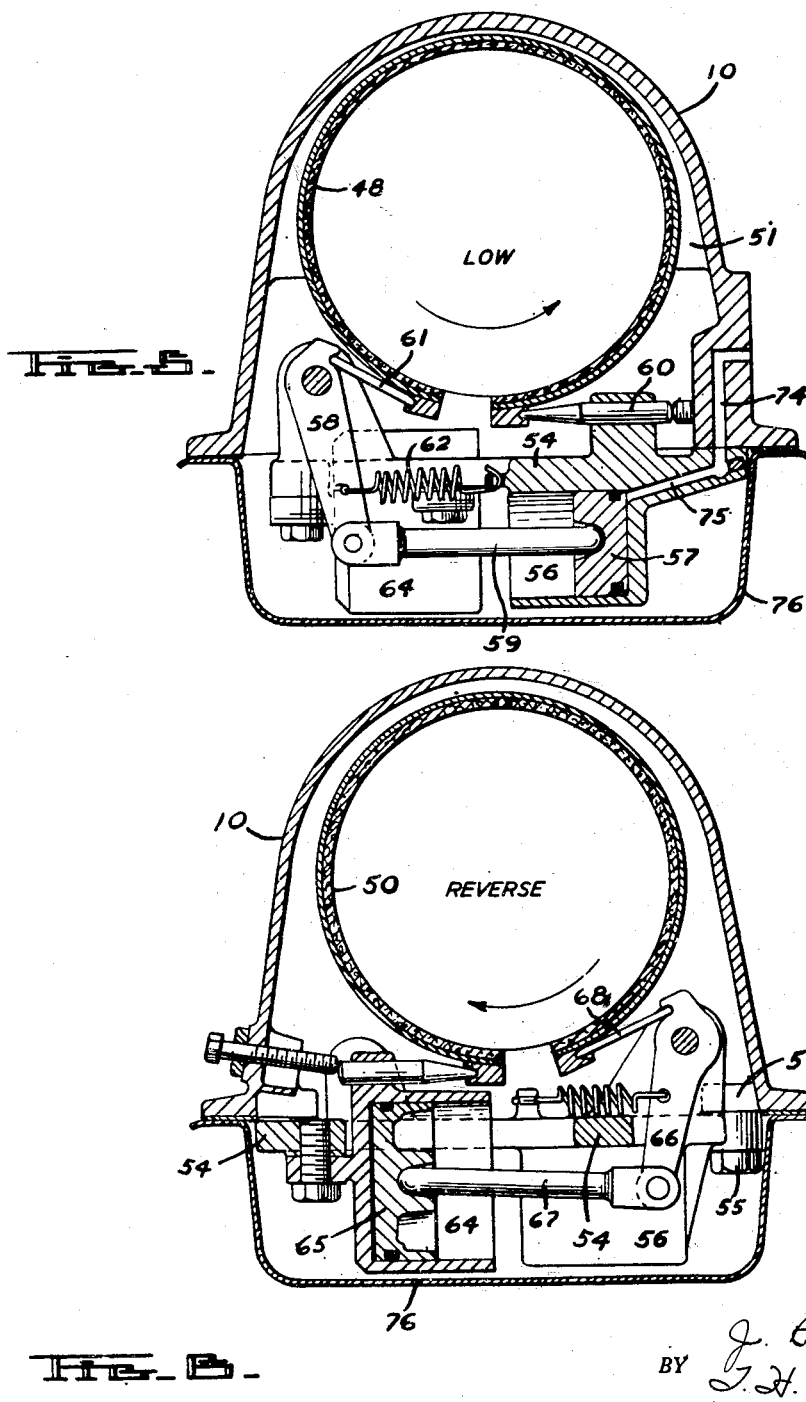

E. C. MCRAE
INVENTOR.

BY
ATTORNEYS

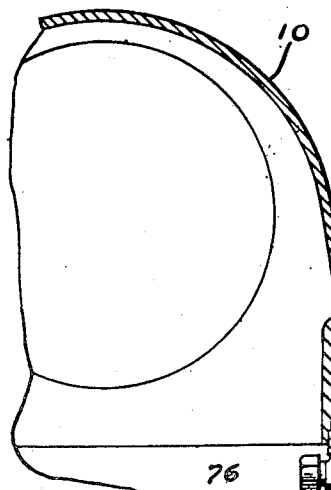
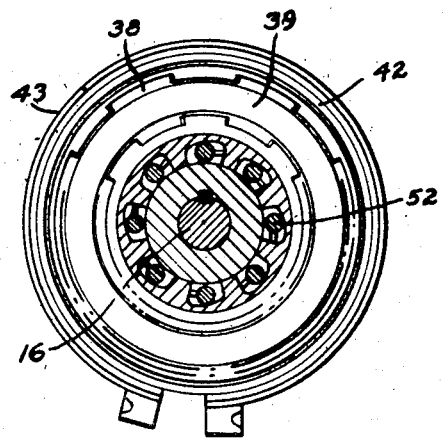
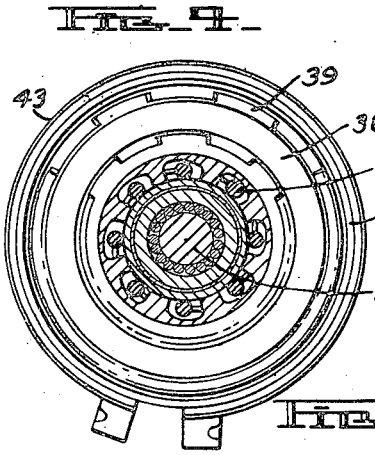
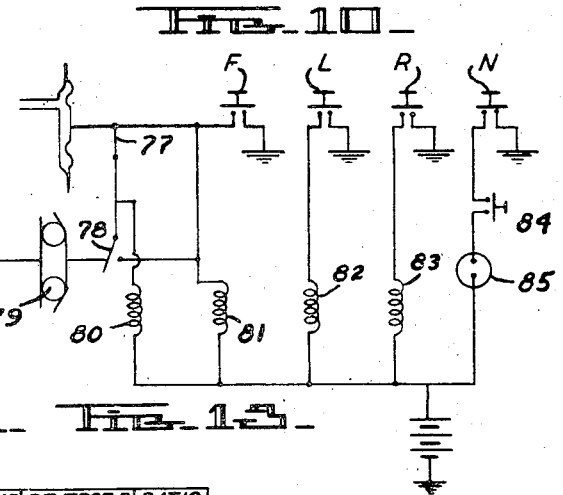
|  | CLUTCH | INTERMEDIATE B | LOW B | REVERSE B | RATIO |
|---|---|---|---|---|---|
| NEUTRAL | OUT | OFF | OFF | OFF | 0.00 |
| INTERMEDIATE | OUT | ON | OFF | OFF | 1.57 |
| DIRECT | IN | ON | OFF | OFF | 1.00 |
| LOW | OUT | OFF | ON | OFF | 2.30 |
| REVERSE | OUT | OFF | OFF | ON | 2.00 |
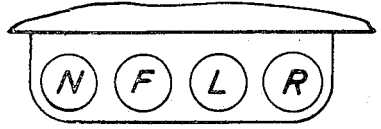
E. C. McRAE
INVENTOR
BY J. P. Faulkner
G. H. Oster
ATTORNEYS Patented Feb. 17, 1953

2,628,510

UNITED STATES PATENT OFFICE 2,628,510

VEHICLE TRANSMISSION CONTROL

Edwin C. McRae, Dearborn, Mich., assignor to Ford Motor Company, Dearborn, Mich., a corporation of Delaware Original application November 17, 1949, Serial No. 127,849. Divided and this application June 2, 1950, Serial No. 165,725

2 Claims. (Cl. 74—752)

This application is a division of my co-pending application Serial No. 127,849, filed November 17, 1949, for Vehicle Transmission, now Patent No. 2,514,963.

The object of my invention is to provide a vehicle transmission of a planetary gear type in which each of the various speed ratios is effected by the application of a single band brake or clutch. My improved transmission provides one reverse and two forward reduced gear ratios together with a direct drive coupling.

A further object of my invention is to provide a vehicle transmission having three forward speeds and one reverse speed and in which a single element is used as the driving member for effecting all of such speeds and another single element is used as the driven member for all of such speeds. The advantage of this construction is that it becomes unnecessary to clutch or declutch either the driving element or the driven element for effecting any of the speeds of the transmission. The applicant is aware that many transmissions having this characteristic have been designed, but believes that all three speed transmissions of this type require the simultaneous application of one clutching element with the release of another element. This requires delicate synchronization which is avoided in the unit shown.

The applicant's transmission is unique in that a single driving element and a single driven element are coupled in such manner as to produce three forward speeds and one reverse speed by the application of a single braking element for each speed and wherein the direct drive coupling is effected without disengaging the intermediate speed coupling. The shift from intermediate speed to direct drive may therefore be made under power and without the necessity of synchronizing the two clutch members.

A further object of my invention is to provide a transmission through which the engine of the vehicle may be cranked by the car even when the transmission is in neutral position. The advantage of this construction is that when it is desired to start the engine by pushing the car, it is unnecessary to engage any of the bands or clutches. Inasmuch as the clutches in automatic transmissions are usually hydraulically operated, it has heretofore been necessary to provide a separate source of power, driven by the wheels of the vehicle, to apply the bands when the car is to be started by pushing. With my improved transmission it is not necessary to provide such auxiliary source of power.

A further object of my invention is to provide a transmission in which the clutch which is engaged to effect the direct drive speed transmits only about ⅓ engine torque. This is particularly advantageous in that where such clutch is hydraulically operated, it permits the use of low oil pressure for the operation of the clutch.

A further object of my invention is to provide a transmission having several bands therein which are actuated by individual cylinder and piston assemblies and wherein all of these cylinder and piston assemblies are mounted upon a plate which is readily detachable from the bottom of the transmission. This construction permits the assembly of the piston and cylinder units separate from the transmission.

With these and other objects in view, my invention consists of the arrangement, construction and combination of the various parts of my improved device, as described in this specification, claimed in my claims, and illustrated in the accompanying drawings, in which:

Figure 5 is a sectional view, taken upon the line 5—5 of Figure 1.

Figure 6 is a sectional view, taken upon the line 6—6 of Figure 1.

Figure 9 is a sectional view, taken upon the line 9—9 of Figure 8.

Figure 10 is a sectional view, taken upon line 10—10 of Figure 1.

Figure 11 is a sectional view, taken upon line 11—11 of Figure 1.

Figure 12 is a chart showing which bands or clutches are engaged for each of the gear ratios provided in the transmission, and Figure 13 is a wiring diagram of the push button control for operating the valve block, shown in Figure 8, and Figure 14 is a view of the push button control used with this transmission.

Figure 1:
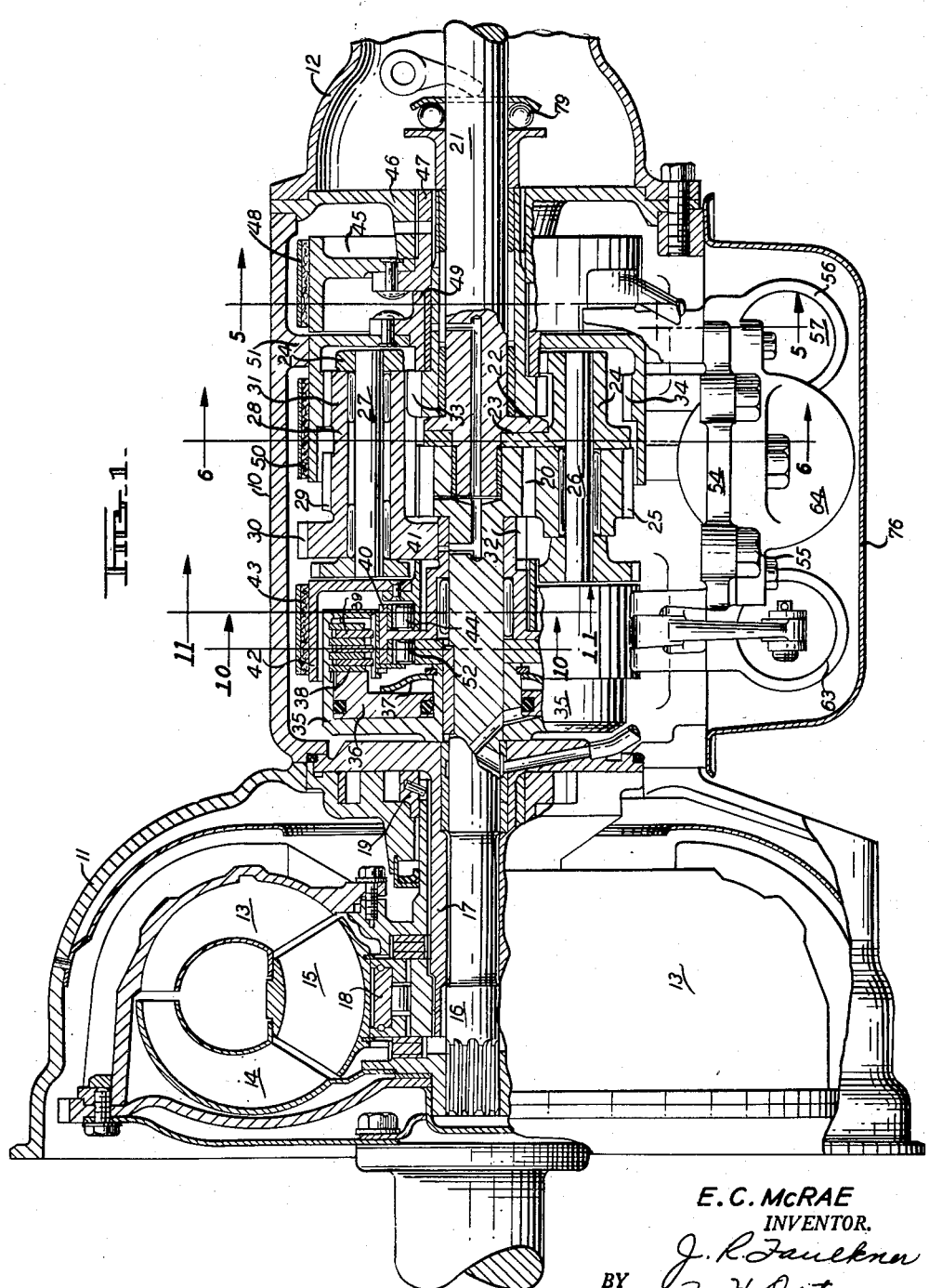
Figure 1 is a longitudinal sectional view through my improved transmission.

Referring to the accompanying drawings, I have used the reference numeral 10 to indicate the housing for my improved transmission. The housing 10 is bolted to the rear face of a torque converter housing 11 and a tubular supporting housing 12 is bolted to the rear face of the housing 10. The forward face of the converter housing 11 is secured to the rear end of the vehicle engine in the conventional manner.

I have shown a conventional torque converter installed just ahead of my transmission but no claim is made that this converter, per se, is part of the invention. It is possible to operate my transmission with a conventional friction clutch interposed between it and the vehicle engine or with a fluid coupling instead of the torque converter shown. However, the gear ratios chosen in the design illustrated were selected to obtain overall ratios which are the product of the torque multiplication in the converter and the positive gear ratios in the transmission. The torque converter selected has a maximum torque amplification of about 2–1 at stall speed and couples up as a fluid coupling at about 1600 R. P. M.

In order that the complete unit may be better understood, I have designated the pump element of the converter by the reference number 13, the turbine element by the numeral 14, and the reactor element by the numeral 15. The turbine element 14 is splined to the forward end of a transmission drive shaft 16 while the reactor element 15 is mounted upon a stationary sleeve 17 through an overrunning clutch 18. The pump element 13 extends rearwardly to position adjacent to the transmission proper and drives an oil pump gear 19 at all times that the engine is operating.

As has been mentioned, the converter elements just described are not claimed to be new or novel, but have been described to show how the torque converter cooperates with the transmission to produce the desired overall gear ratios. The only important function of the converter is to produce a two to one torque amplification on the shaft 16 for starting which automatically is reduced to one to one when the converter couples up at about 1600 R. P. M.

The drive shaft 16 extends from the torque converter rearwardly into the housing 10 and terminates in a drive gear 20. A driven shaft 21 extends rearwardly from the rear end of the drive shaft 16 and projects from the support housing 12. The forward end of the driven shaft 21 is provided with a flange 22 which is fixedly secured to a center web 23 of a planet carrier 24. The planet carrier 24 serves to rotatably support the planet pinions which effect the various gear ratios produced by the transmission.

Equally spaced around the periphery of carrier 24 are three pinions 25 each of which is in mesh with the drive gear 20. Only one of these pinions is shown in the diagrammatic views 2, 3 and 4, as a complete showing would make it more difficult to understand the gearing. However, in the actual construction there are three sets of the pinions shown equally spaced around the sun gears. These pinions are rotatably mounted upon pins 26 which extend lengthwise through the carrier. Angularly spaced from each of the pins 26 I have provided other pins 27, each of which supports a triple-planet pinion element 28. The triple pinion element 28 is composed of a center pinion 29 which is in mesh with the adjacent pinion 25. Each triple pinion also comprises a gear 30 and gear 31 located respectively at the forward and rear ends of the triple member. The gear 31 is the same size as pinion 29 but the gear 30 is considerably larger than the gear 29. An intermediate speed sun gear 32 is rotatably mounted upon the drive shaft 16 just forwardly of the drive gear 20 and is in position to mesh with each of the gears 30. A low speed sun gear 33 is rotatably mounted on the forward end of the driven shaft 21 just rearwardly of the flange 22 and is in position to mesh with each of the gears 31. A reverse speed internal gear 34 is rotatably mounted on the hub of the gear 33 and extends forwardly in position to mesh with each of the three gears 31. Means have been provided for selectively holding the gears 32, 33, and 34 from rotation to effect the various speed ratios. However, before describing such means it may be well to consider the gearing employed for each of the speed ratios.

Figure 2:
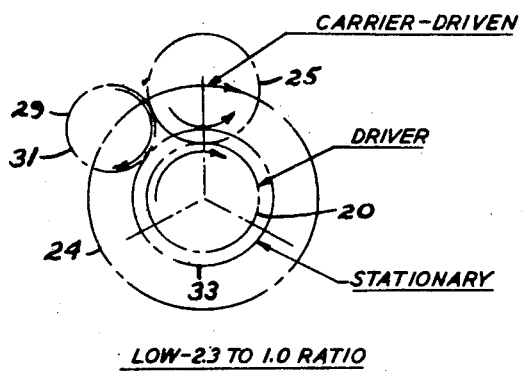
Figure 2 is a diagrammatic view showing the gearing employed to effect the low speed gear ratio.

Referring to Figure 2, I have shown the gearing which is employed in effecting the low-speed ratio. It will be noted from this view that when the gear 20 is driven in a clockwise direction and the gear 33 is held stationary, the carrier 24 is driven forwardly at a reduced speed ratio. When the gear 20 is provided with 21 teeth and the gear 33 provided with 27 teeth the carrier is driven in the same direction as the gear 20, one revolution for each 2.3 revolutions of the gear 20. Thus a 2.3 to 1 low speed ratio is obtained.

Figure 3:
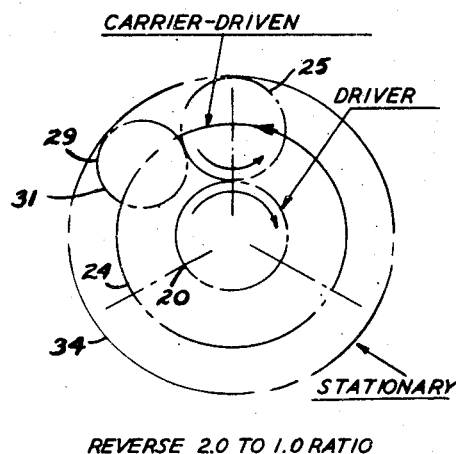
Figure 3 is a diagrammatic view showing the gearing employed to effect the reverse speed gear ratio.

Referring to Figure 3 it will be noted that when the gear 20 is driven forwardly and the internal gear 34 is held stationary the carrier 24 is driven in a reverse direction at a reduced speed. The gear ratio effected with an internal gear having 63 teeth produces a reverse speed the ratio of 2.0.

Figure 4:
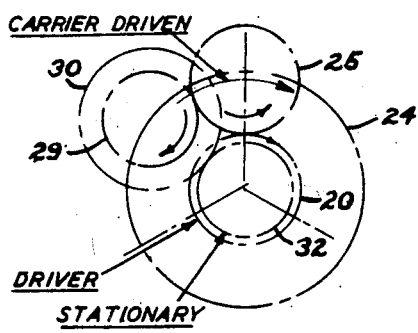
Figure 4 is a diagrammatic view showing the gearing employed to effect the intermediate speed gear ratio.

The gearing which provides the intermediate speed ratio is shown in Figure 4 from which it will be seen that when the sun gear 32 is held stationary and the gear 20 is driven forwardly the carrier 24 will be driven forwardly at a reduced speed. When the sun gear 32 is provided with 18 teeth and the pinion 29 and gear 30 are provided with 18 and 27 teeth, respectively, the carrier will be driven forwardly one revolution for each 1.57 revolutions of the gear 20. Thus a 1.57 to 1 intermediate speed ratio is obtained.

From the foregoing it will be seen that to effect the low gear of the transmission it is only necessary to hold the gear 33 from rotation. To effect the reverse speed ratio it is only necessary to hold the internal gear 34 from rotation, and to effect the intermediate speed gear ratio it is only necessary to hold the gear 32 from rotation. The direct drive ratio is effected by clutching the gear 32 to the drive shaft 16 so that the gears 32 and 20 must rotate in synchronism. This locks up the entire gear train and of course causes the carrier to rotate with the drive shaft at 1 to 1 ratio.

In order to frictionally connect the gear 32 to the drive shaft 16, I have provided a hydraulically operated friction clutch. This clutch comprises a housing 35 which is keyed to the shaft 16 and in which housing a piston 36 is reciprocally mounted. The piston 36 is urged to its inoperative position by means of a spring washer 37. Within the housing 35 I have provided a series of drive discs 38 which are splined therein and which discs are all alternated with driven discs 39. The discs 39 are splined to a clutch hub 40 which is formed integrally with the gear 32. When fluid under pressure is forced between the housing 35 and the piston 36, the discs 38 and 39 will be frictionally forced together to thereby connect the gear 32 to the shaft 16.

It will be noted from Figure 4 that intermediate speed is effected only when the sun gear 32 is held from rotation. To hold this sun gear 32 from rotation I have provided a sleeve 41 rotatably mounted upon the hub 40 and a brake drum 42 is fixedly connected to the sleeve 41. An intermediate speed band 43 is disposed within the housing in a position to co-act with the drum 42. Referring to Figure 11, it will be noted that an overrunning brake 44 is disposed between the hub 40 and the sleeve 41. The cam faces of the overrunning brake are so disposed that the hub 40 may rotate in the direction of engine rotation independently of the sleeve 41. The overrunning brake permits the hub 40 and gear 32 to rotate in a forward direction even when the drum 42 is held stationary by band 43. However, should the forces on the gear 32 tend to rotate this gear in a direction opposite to engine rotation the brake 44 causes the drum 42 to be so rotated unless it is held stationary by the band 43. When the drum 42 is free to rotate, then the gear 32 may of course, rotate in either direction.

From the foregoing it will be seen that intermediate speed ratio is effected by engaging the band 43 to the drum 42 to thereby prevent the gear 32 from rotating in a reverse direction. If now it is desired to engage the direct drive, it is only necessary to engage the clutch 35 which connects the gear 32 to the drive shaft 16. It should be noted that when this clutch is engaged, it is not necessary to disengage the band 43. Consequently, power may be continuously applied through the transmission during the transition period from intermediate speed to direct drive. Inasmuch as the band 43 is normally left engaged during direct drive only the clutch 35 need be operated so that there is no need to synchronize the operation of this clutch with any other member.

The low speed ratio of the transmission is effected by holding the gear 33 from rotation while driving the gear 30 forwardly. To accomplish this a brake drum 45 is rotatably mounted in a transmission end plate 46. The hub of brake drum 45 is splined to a sleeve 47 whis is formed integrally with the gear 33. A low speed band 48 is disposed within the housing 10 in position to co-act with the drum 45 and thus hold the gear 33 from rotation.

To effect the reverse speed ratio of the transmission, it is only necessary to hold the internal gear 34 from rotation. The gear 34 is provided with a hub 49 which is rotatably mounted upon the sleeve 47. A reverse speed brake band 50 is positioned within the housing to co-act with the periphery of the gear 34. As is characteristic of all reverse gear ratios, the torque which must be withheld by the reverse speed band is a product of the engine torque and the gear ratio plus the engine torque $(F = T \times (R+T))$. This force is considerably higher than any other force involved in the transmission and would normally cause a heavy side thrust on the reverse speed drum. To overcome the detrimental lateral deflection of the gear set, due to this side thrust, an annular boss 51 is provided in the housing 10 which closely fits the periphery of the gear 34, just rearwardly of the reverse band 50. There is sufficient clearance between the boss 51 and the gear 34 that in neutral and in all forward speeds the gear 34 is free to rotate. However, when the reverse speed band is applied and the transmission is placed under load, the force which tends to rotate the band around its anchor is resisted by the boss 51. Under this condition there is no rotation between the gear 34 and the boss 51 so that the boss simply acts as a support and not as a bearing.

It will be noted that in neutral position where all of the bands are free from their respective drums and the planetary lockup clutch 35 is out of engagement, rotation of the drive shaft 16 simply rotates the gear 32 and brake drum 42 in a reverse direction. When the reverse speed ratio is engaged the gear 32 is likewise rotated in a reverse direction relative to the drive shaft 16. When the low speed ratio is engaged the gear 32 is also rotated in a reverse direction but at a somewhat slower speed relative to the gear 20. When intermediate speed ratio is engaged the gear 32 is held from rotation. In direct drive the gear 20 is coupled to the gear 32 so that the two gears rotate in synchronism with each other. Consequently, the gear 32 in all of the various speeds, (i. e. neutral, reverse, low, intermediate and direct drive) is never called upon to rotate faster than the drive shaft 16.

I have made use of this characteristic of this particular gearing to provide a direct drive from the driven shaft 21 to the drive shaft 16 when the transmission is in neutral position. To accomplish this, an overrunning clutch is inserted between the gear 32 and the shaft 16 which prevents the gear 32 from overrunning the gear 20. This construction is shown in Figure 10 from which it will be noted that one element of an overrunning clutch unit 52 is mounted within the forward portion of the clutch hub 40 while the other element 53 of the overrunning clutch 52 is keyed to shaft 16. The cam faces on this overrunning clutch are so disposed that the hub 40 cannot overrun the shaft 16 in a forward direction. The function of this overrunning clutch is that when power is applied to the driven shaft 21 in a forward direction the gear 32 will tend to overrun the gear 20 in a forward direction. The overrunning clutch 52 prevents this overrunning and locks up the gear set against such rotation. Thus the engine of the car may be started in neutral position simply by pushing the car forward. This feature also prevents free wheeling of the transmission on down grades so that in any speed the engine is available as a brake. A unique feature of this transmission is that when descending a grade with the engine being used as a brake, the low speed band may be engaged for more effective braking without first bringing the car to a stop. This is characteristic of my transmission and makes it unnecessary to provide a wheel driven oil pump to operate any of the bands or clutches to start the engine by pushing the car.

Figure 7:
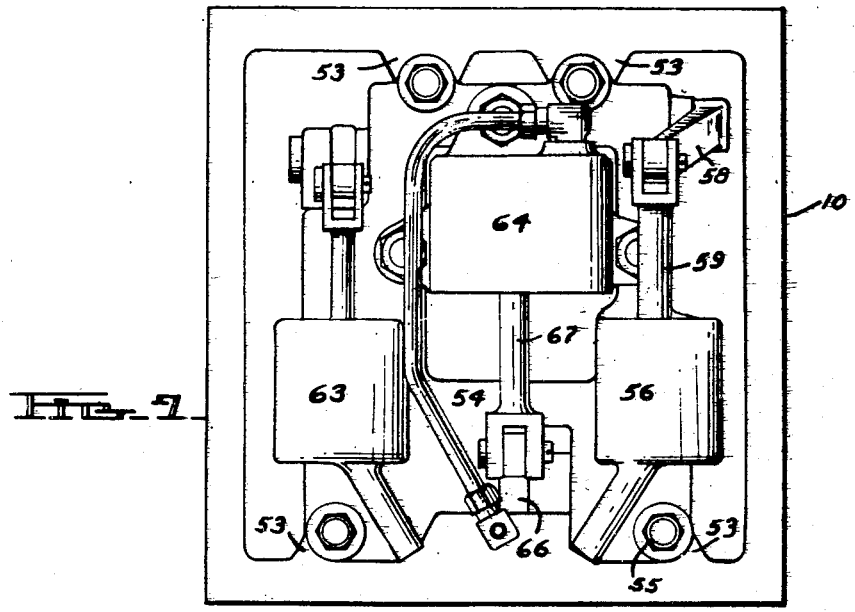
Figure 7 is a view looking up at the underside of the transmission, illustrating the quickly detachable plate which supports all of the operating cylinders.
Figure 8:
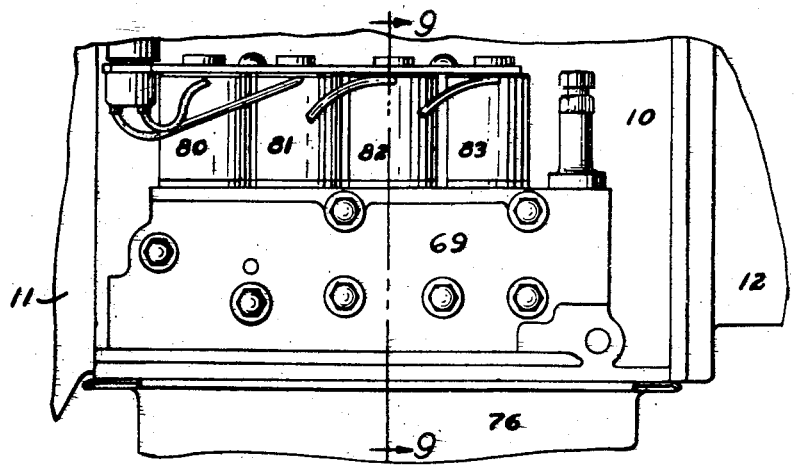
Figure 8 is a side elevation of the transmission showing the solenoid operated valve block.

Figures 5, 6 and 7 illustrate the hydraulically operated mechanism for applying the bands 43, 48 and 50 to their respective drums. It will be noted from these views that the housing 10 is provided with four bosses 53 which extend inwardly from the bottom face of the housing and to which bosses are secured a plate 54. Four cap screws 55 rigidly secure this plate in position. Referring to Figure 5, it will be noted that I have provided a low speed cylinder 56 which is cast integrally with the plate 54, in which cylinder 56 and a piston 57 is reciprocably mounted. An arm 58 is pivotally mounted on suitable bosses which extend upwardly from the plate 54. The free end of the arm 58 is connected to the piston 57 by means of a piston rod 59.

The energized end of the low speed brake band 48 is anchored against rotation by means of a pin 60 while the opposite end of the band 48 is connected to the arm 50 by a link 61. A spring 62 urges the arm 48 and piston 57 to their inoperative positions. Thus, when fluid under pressure is applied to the cylinder 56 the piston 57 will be forced outwardly to thus rotate the arm 58 and apply the brake band 48 to the low speed drum 45.

An intermediate speed brake operating cylinder 63 is also cast integrally with the plate 54 but in alignment with the intermediate speed brake band 43. The piston and operating mechanism associated with this cylinder have not been illustrated in detail because they are substantially the same as the low speed brake operating mechanism, just described.

A reverse speed operating mechanism is illustrated in Figure 6 from which it will be seen that a relatively large cylinder 64 is detachably secured to the underside of the plate 54, which cylinder is provided with a piston 65 which rotates an arm 66 through a connecting rod 67. The arm 66 is connected to the reverse band 50 by a link 68. Thus, when fluid is applied to the piston 65 the arm 66 will be rotated to apply the band 50 to the reverse gear 34.

In assembling the hydraulic operating mechanism it is only necessary to fasten the cylinder 64 to the bottom of the plate 54 and install the various connecting rods and arms. The plate 54 may then be bolted in position to the underside of the housing 10 and the links 61 and 68 and the intermediate speed link inserted to complete the assembly. Suitable adjusting devices are provided for each of the bands, as is customary in this type of mechanism.

Solenoid operated valves are provided for controlling the various pistons and direct drive clutch, but it should be kept in mind that mechanically operated valves may be substituted if it is desired to operate the transmission in such manner. However, in the solenoid operated valves shown, a valve block 69 is secured to one side of the housing 10, which valve block is provided with four piston type balanced valves. These valves are all numbered 70. The upper end of each valve is formed integrally with a solenoid plunger 71. Each plunger 71 and associated valve 70 is urged to its inoperative position by means of a spring 72. A solenoid coil 73 is disposed around each plunger 71, which when energized draws the plunger 71 upwardly against the resistance of the spring 72 to open the particular valve 70 associated therewith. A suitable port 74 is drilled in the housing 10 which lines up with a port 75 drilled in the plate 54 to connect the cylinder 56 with the valve block 69. Other ports, not shown in detail, connect the intermediate speed piston 63, the reverse speed cylinder 64, and the direct drive clutch 35 with their respective valves 70. The hook-up is so made that when each solenoid is operated, fluid under pressure is supplied to the particular cylinder and when the solenoid is deenergized, the cylinder is connected to the discharge port that the fluid therein may readily flow to the sump of the transmission. A suitable oil pan 76 is detachably secured to the lower face of the housing 10 in position to enclose the plate 54 and all of the operating mechanism. Although all of the solenoid valves are identical I have numbered the valves used to effect the direct drive, the intermediate speed, the low speed, and the reverse speed by numerals 80, 81, 82 and 83, respectively.

With the form of control shown, I have provided four position buttons on the instrument panel. These may be conveniently marked with N for neutral, F for forward, L for low and R for reverse. The F, L, and R buttons operate switches which control the intermediate speed, low and reverse speed solenoids, respectively. The switches are arranged so that when any one button is pressed any other button that is at that time engaged will be thrown out. The neutral button is provided so that when depressed any other button which is engaged will be thrown out.

The low, reverse, and intermediate speed gear ratios are engaged manually by pressing the respective buttons but the planetary lockup clutch is engaged automatically. Any one of several well-known torque and speed-responsive mechanisms is suitable for engaging the planetary lockup clutch. In the control selected a vacuum-operated switch 77 is provided which opens a circuit through the direct drive solenoid 80 when the vacuum in the engine manifold is reduced below a predetermined value. This switch is connected in series with the push button F as shown in Figure 13. A second switch 78 is arranged to by-pass the switch 77, the switch 78 being operated by a governor 79.

The switch operated by the N button is connected in series with a starter switch 84 and starter relay 85. Thus the engine can be cranked by the starter only when in neutral position.

In the normal operation of the transmission in a forward direction, the F button is depressed and the engine accelerated. The vacuum in the intake manifold will drop under these conditions to open the switch 77. The switch 77 will thereby break the circuit with the direct drive solenoid 80 to thereby disengage the planetary lockup clutch. The intermediate speed band 43 however will remain engaged so that the transmission under these conditions will operate in intermediate speed. If now the vacuum in the intake manifold raises above the predetermined value or the governor 78 attains a predetermined speed, either of the switches 77 or 78 will be closed to thereby engage the planetary lockup clutch 35. If the speed of the governor is maintained above that corresponding to about 50 miles per hour, operation of the vacuum switch 77 will have no effect in disengaging the planetary lockup clutch. However, should the car speed be lower than 50 miles per hour and the throttle of the engine is suddenly opened, the vacuum in the manifold will immediately drop off and de-energize the planetary lockup clutch solenoid to place the transmission in intermediate speed ratio. However, as soon as the vacuum again increases, the planetary lockup clutch will be engaged to again place the transmission in direct drive.

Due to the fact that a 2 to 1 torque amplification is obtained in the converter, all normal starting in a forward direction may be obtained in intermediate speed. This provides an overall ratio of over 3 to 1. This permits the converter to quickly reach engine speed while still operating under a 1.57 to 1 ratio. The low and reverse speed ratios are manually engaged because they are only used occasionally.

Among the many advantages arising from the use of my improved transmission it may be well to mention that I have provided a transmission having three forward speeds and one reverse speed in which the driving shaft and the driven shaft are connected to each other at each particular gear ratio by the operation of a single control member and in which the transition from intermediate speed to direct drive is accomplished by the engagement of a single clutch without the release of any other member. Thus, synchronization and its associated troubles are avoided in this transmission.

Still a further advantage obtained with this transmission is that a 1 to 1 drive from the driven shaft to the driveshaft is obtained in neutral position to thus make it unnecessary to operate any band or clutch when the engine is to be started by pushing the car.

Some changes may be made in the arrangement, construction, and combination of the various parts provided in my improved transmission without departing from the spirit of my invention and it is my intention to cover by my claims such changes as may reasonably be included within the scope thereof.

I claim as my invention:

1. In a variable speed mechanism for a motor vehicle, in combination, an engine, variable speed gearing driven by said engine, brake means arranged when applied to shift said variable speed gearing to a predetermined speed reduction, a solenoid operated valve controlling said brake means, clutch means arranged when engaged and said brake means are applied to shift said variable speed gearing into direct drive, a second solenoid operated valve controlling said clutch means, a manually operated switch, said first and second solenoids being arranged in parallel with each other and in the circuit of said manually operated switch, a vacuum controlled switch and a speed responsive switch arranged in parallel with each other and in the branch circuit of said second solenoid so that the variable speed gearing operates in said speed reduction when both the engine vacuum and vehicle speed are below predetermined values and in direct drive when either engine vacuum or the vehicle speed are above predetermined values.

2. In a variable speed transmission for a motor vehicle, in combination, an engine, variable speed gearing driven by said engine, brake means associated with said gearing and arranged when applied to condition said gearing to transmit torque at a predetermined speed reduction, fluid pressure means for applying said brake means, a solenoid operated valve controlling the fluid pressure means for said brake means, clutch means associated with said gearing and arranged when engaged and said brake means are applied to condition said gearing to transmit torque in direct drive, fluid pressure means for engaging said clutch means, a second solenoid operated valve controlling the fluid pressure means for said clutch means, a source of electrical power arranged to energize said first and second solenoids, a manually operated switch common to the circuits of said first and second solenoids, a speed responsive switch in the circuit of said first solenoid only and a vacuum controlled switch in parallel with said speed responsive switch so that the circuit through said first solenoid will be completed whenever either the vehicle speed or the engine vacuum exceeds their respective predetermined values thereby placing said transmission in direct drive.

EDWIN C. McRAE.

REFERENCES CITED

The following references are of record in the file of this patent:

UNITED STATES PATENTS

| Number | Name | Date |
|---|---|---|
| 2,251,625 | Hale | Aug. 5, 1941 |
| 2,281,916 | Claytor | May 5, 1942 |
| 2,366,253 | Griswold | Jan. 2, 1945 |
| 2,366,254 | Paton | Jan. 2, 1945 |